(12) United States Patent
Tseng

(10) Patent No.: US 9,472,964 B2
(45) Date of Patent: Oct. 18, 2016

(54) INTERCHANGEABLE INTELLIGENT ACCESSORIES FOR MOBILE DEVICES

(76) Inventor: Chien-Chung Tseng, San Jose, CA (US)

( * ) Notice: Subject to any disclaimer, the term of this patent is extended or adjusted under 35 U.S.C. 154(b) by 870 days.

(21) Appl. No.: 13/585,352

(22) Filed: Aug. 14, 2012

(65) Prior Publication Data

US 2013/0069431 A1    Mar. 21, 2013

Related U.S. Application Data

(60) Provisional application No. 61/512,443, filed on Sep. 21, 2011, provisional application No. 61/558,352, filed on Nov. 10, 2011.

(51) Int. Cl.
*H02J 1/10* (2006.01)
*H02J 7/00* (2006.01)

(52) U.S. Cl.
CPC ............ *H02J 7/0044* (2013.01); *H02J 7/0054* (2013.01); *H02J 2007/0062* (2013.01); *H02J 2007/0096* (2013.01); *Y10T 307/50* (2015.04)

(58) Field of Classification Search
CPC .................................................. H02J 7/0044
USPC ........................................................... 307/43
See application file for complete search history.

(56) References Cited

U.S. PATENT DOCUMENTS

| | | | |
|---|---|---|---|
| 8,483,758 B2* | 7/2013 | Huang | 455/557 |
| 2004/0037420 A1* | 2/2004 | Brieskorn | H04M 1/0295 379/419 |
| 2007/0123304 A1* | 5/2007 | Pattenden et al. | 455/557 |
| 2011/0199041 A1* | 8/2011 | Yang | 320/101 |
| 2012/0052908 A1* | 3/2012 | Kao et al. | 455/557 |

* cited by examiner

*Primary Examiner* — Carlos Amaya

(57) ABSTRACT

Techniques for an interchangeable modular design for mobile device accessories by separating a mobile device accessory into two modules are disclosed herein. The power and data interfaces between a power module and an expansion adapter are predetermined as a standardized design. The power module includes a battery to supply electrical power. The power module has a form-fitting shape adapted to secure a particular mobile device with the power module. The expansion adapter includes interfaces to be connected to the mobile device and the power module. The power module can receive electrical power supplied from the battery of the power module. The expansion adapter and/or power module may include additional hardware functionalities.

18 Claims, 13 Drawing Sheets

INTERCHANGEABLE INTELLIGENT ACCESSORIES FOR MOBILE DEVICES

RELATED APPLICATIONS

This application claims the benefit of U.S. Provisional Application No. 61/512,443, having a filing date of Sep. 21, 2011, and U.S. Provisional Application No. 61/558,352, having a filing date of Nov. 10, 2011, all of which are incorporated herein by references.

FIELD OF THE INVENTION

This invention relates generally to mobile device accessories, and in particular to accessories containing interchangeable modules providing additional battery capacity and hardware functionalities for mobile devices.

BACKGROUND

Mobile devices (also known as handheld devices) including smart phones and tablet computers have been gaining increasing performance capability over recent years. For example, the central processing units (CPUs) and graphics processing unit (GPUs) in smart phones nowadays have a much more advanced computing ability than a conventional feature phone. The computing abilities of the modern smart phones enable the smart phones to perform advanced applications beyond conventional functions such as phone calling, text messaging and emailing. A modern smart phone can serve to combine the functions of portable media players, compact digital cameras, pocket video cameras, GPS navigation units, and video game consoles.

There are mobile device accessories designed to add functionalities or enhance existing functionalities for mobile devices. These mobile device accessories have interfaces to be connected with the mobile devices. The accessories can draw electrical power via the interface from the built-in batteries of the mobile devices to perform the functionalities of the accessories. The functionalities include abilities to detect and upload information to the mobile device, as well as abilities to download and present information from the mobile device.

For example, there exists a credit card reader accessory for smart phones. The credit card reader accessory can attach to and connect itself to a smart phone via a connector interface. Powered by the battery from the smart phone, the credit card reader accessory can read the information stored on the magnetic stripe of a credit card, and upload the credit card information to the smart phone. The smart phone receives the credit card information, optionally receives a customer signature via its touch screen, and then transmits the transaction information to a remote server via a network such as a cellular network.

However, these mobile device accessories pose an extra burden on the mobile devices' internal battery. While the power hungry CPUs and GPUs of modern mobile devices already cause unsatisfying total running time of the mobile devices, the power drawn from the internal battery to run the accessories further reduces the time that the mobile devices can run on a single charge of the internal batteries.

For example, there exists a projector accessory for smart phones. The projector accessory connects to a mobile device via a connector interface of the mobile device. Utilizing its CPU and/or GPU, the mobile device generates video signals and transfers the video signals to the projector accessory via the connector interface. The projector accessory receives the video signals and projects the corresponding image and/or video onto a projection screen or wall using an optical lens system. A large amount of energy is needed for the lamp of the projector accessory to emit light. The projector can include a built-in rechargeable battery so that the lamp draws power from the built-in rechargeable battery, instead of the internal battery of the mobile device. However, such a projector accessory with a built-in rechargeable battery is heavy and expensive. In addition, the built-in rechargeable battery can only serve the power need of the projector accessory but not other accessories. Once the projector accessory is detached from the mobile device, the built-in rechargeable battery within the projector accessory is no longer electrically coupled to the mobile device or other accessories.

In addition, mobile devices of various models and generations have different shapes and different types of connector interface. Generations of mobile devices continue evolving to provide more features and greater functionalities. For example, to accommodate touch screens having larger sizes and greater resolutions, the smart phones of a newer generation are typically taller and wider than the smart phones of an older generation. Also, mobile devices use different types of connector interfaces. Even a mobile device of a newer generation can have a different connector interface than the mobile device of an older generation, for reasons such as enabling faster data transfer rates and accommodating a new shape of the device. Therefore, an accessory designed for a mobile device of a particular model and generation does not generally work with other mobile devices of different models or generations.

Most form-fitting mobile device accessories are designed for a mobile device of a particular model and a particular generation. The shape of a mobile device accessory is designed to fit a particular mobile device. The mobile device accessory securely attaches to the mobile device to retain the mobility of the device so that a user can utilize the combination of the mobile device and accessory like a single device. The accessory also has an interface specifically designed to connect to a particular connector interface of the mobile device. Thus, once a mobile device changes its shape design or connector interface type in its new generation, a mobile device accessory designed for an older generation no longer can securely attach to the new generation device, or the mobile device accessory's interface can not properly connect to the newly designed connector interface of the new generation device.

SUMMARY

The technology introduced here uses an interchangeable modular design for mobile device accessories by separating a mobile device accessory into two modules. A power module includes a battery to supply electrical power. The power module has a form-fitting shape adapted to secure a particular mobile device with the power module. The power module further includes a power output interface and a data interface. Another separate module, an expansion adapter, includes a device interface, a power input interface and a power module communication interface. The device interface is configured to electrically connect to the mobile device ire a detachable manner. The power input interface is configured to detachably connect to the power output interface of the power module, in such a way that the expansion adapter can draw electrical power from the battery of the power module via the power output interface. The power module communication interface is configured to detachably connect to the data interface of the power module.

The power and data interfaces between the power module and the expansion adapter are predetermined as a standardized design. The expansion adapter can be detached from the power module and replaced with another expansion adapter having the same standardized power and data interfaces. Thus, the power module can attach to and work with different expansion adapters having various hardware functionalities. On the other hand, the power module can be detached from the expansion adapter and replaced with another power module designed for adapting another type of mobile device. Thus, an expansion adapter can operate with any particular mobile device, by selecting a power module that is designed for that particular mobile device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
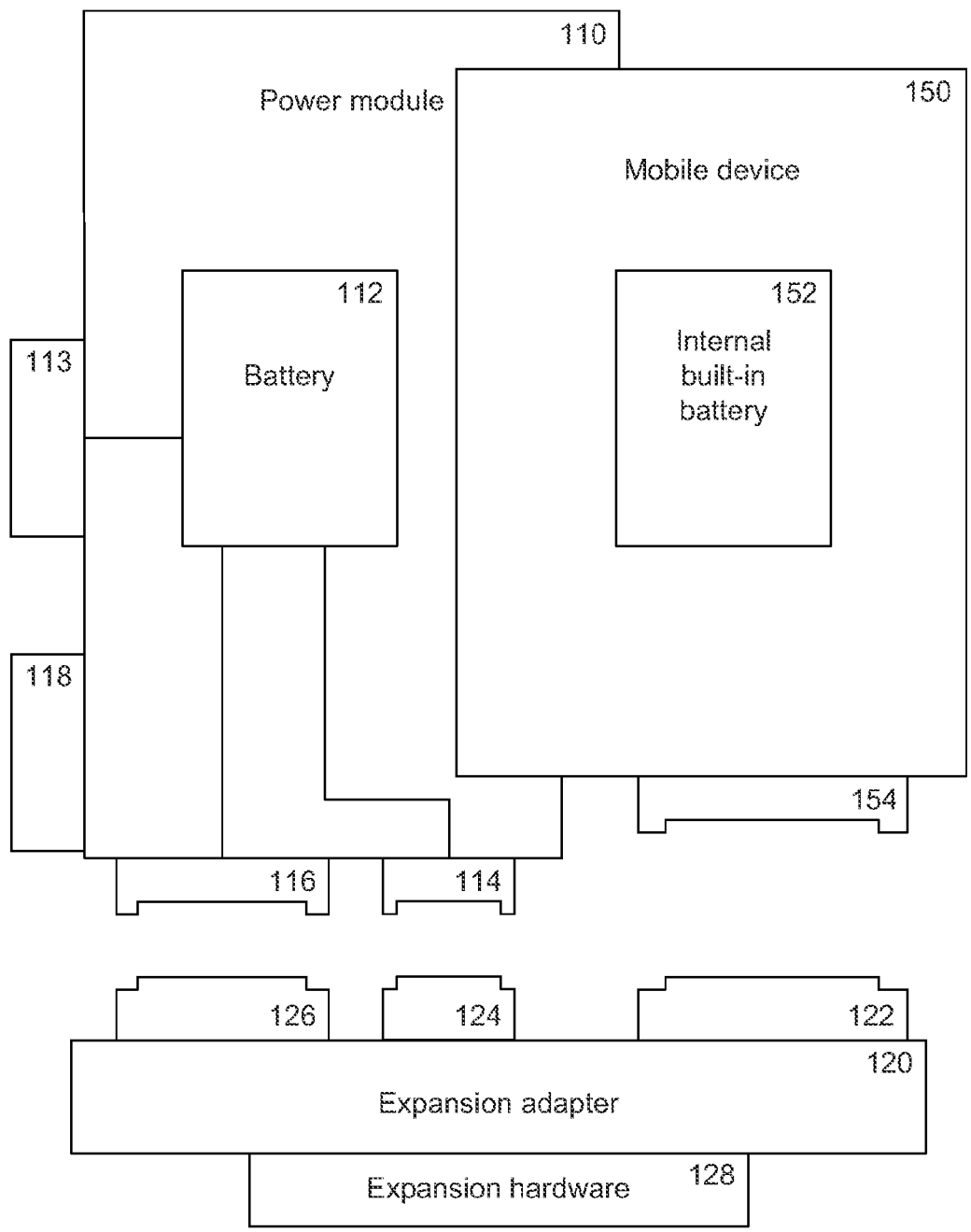
FIG. 1 illustrates a high level block diagram of an example modular mobile device accessory including a power module and an expansion adapter designed to operate with a mobile device.

FIG. 1 illustrates a high level block diagram of a modular mobile device accessory designed to operate with a immobile device, in accordance with one embodiment of the present invention. The modular mobile device accessory 100 includes a power module 110 and an expansion adapter 120, as shown in FIG. 1. The power module 110 has a form-fitting shape or a mechanical mechanism adapted to secure the mobile device 150 with the power module 110. The power module 110 can securely attach to the mobile device 150 to retain the mobility of the mobile device 150 in such a way that a user can utilize the combination of the mobile device 150 and the modular mobile device accessory 110 like a single device. The form-fitting shape of the power module 110 tightly follows contours of a part of the mobile device 150 that is closely engaged to the power module 110 when the mobile device 150 is secured with the power module 110. In some embodiments, the power module 110 may include a mechanical mechanism or a feature of its shape to securely attach to the mobile device 150.

The power module 110 includes a battery 112. The battery 112 can operate as an external power source to supply electrical power for the mobile device 150, in addition to the mobile device 150's own internal built-in battery 152. In some embodiments, the battery 112 can further operate as a power source to supply electrical power for the expansion adapter 120. The power module 110 further includes a power output interface 114 and a data interface 116. The power output interface 114 is designed to supply electrical power and current to the expansion adapter 120. The data interface 116 is designed to transmit and receive data regarding the status and control information for the battery 112. In some embodiments, the data interface 116 can transmit and receive other data such as control signals for an expansion hardware in the power module 110. In one embodiment, the power output interface 114 includes one or more metal pins or metal contacts for supplying electrical power; and the data interface 116 includes one or more metal pins or metal contacts for data communication.

The power module 110 can include a charging interface 113 such that the battery 112 can be charged via the charging interface. In one embodiment, the charging interface 113 is a wireless charging component which enables the battery 112 to be charged wireless by using an induction technology.

The expansion adapter 120 is a module separate from the power module 110 and is designed to detachably connect to the mobile device 150 and power module 110. In one embodiment, the expansion adapter 120 is attached to the power module 110 to form a modular mobile device accessory 100 and the accessory 100 is attached to the mobile device 150. The expansion adapter 120, the power module 110 and the mobile device 150 form a single device having larger power capacity than the mobile device 150 only, and can provide additional hardware functionalities that the mobile device 150 alone can not achieve. Since the expansion adapter 120 is a module separate from the power module 110, different embodiments of the expansion adapter 120 can be attached to the power module 110 to realize different hardware functionalities. Therefore, each type of the expansion adapter 120 can replace another type of the expansion adapter 120 to attach to the power module 110 and the mobile device 150 to provide one or more respective hardware functionalities.

The expansion adapter 120 includes a device interface 122 configured to electrically connect to a connector 154 of the mobile device 150 in a detachable manner. For example, in one embodiment, the mobile device 150 is an iPhone 4 or iPhone 4S smart phone having a 30-pin connector receptacle 154. The device interface 122 is a 30-pin male connector. In another embodiment, the mobile device 150 is an Android tablet having a micro USB connector receptacle 154. The device interface 122 includes a male micro USB connector to transfer electrical power and data. The device interface 122 can include power interfaces, data interfaces, audio interfaces, video interfaces and other electrical or optical interfaces. In some embodiments, these interfaces can include metal pins or metal contacts for transferring electrical power, data, and/or signals.

The expansion adapter 120 further includes a power input interface 124 configured to detachably connect to the power output interface 114 of the power module 110. In one embodiment, the power output interface 114 of the power module 110 includes one or more metal contacts for supplying electrical power; the power input interface 124 of the expansion adapter 120 includes the same number of metal pins as the metal contact of interface 114 for receiving electrical power. When the expansion adapter 120 is attached to the power module 110, the power input interface 124 is electrically coupled to the power output interface 114 so that the expansion adapter 120 can draw electrical power from the battery 12 of the power module 110, via the power output interface 114 and the power input interface 124.

The expansion adapter 120 further includes a power module communication interface 126 configured to detachably connect to the data interface 116 of the power module 110. In one embodiment, the data interface 116 of the power module 110 includes one or more metal contacts; the power module communication interface 126 of the expansion adapter 120 includes the same number of metal pins as the metal contact of interface 116 for data communication between the expansion adapter 120 and the power module 110. When the expansion adapter 120 is attached to the power module 110, the power module communication interface 126 is electrically coupled to the data interface 116 so that the expansion adapter 120 and the power module 110 can conduct one-way or two-way data communication between them.

In one embodiment, when the expansion adapter 120 is attached to the power module 110 to form a modular mobile device accessory 100 and the accessory 100 is attached to the mobile device 150, the expansion adapter 120, the power module 110 and the mobile device 150 form a single device in such a way that the electrical circuit and any hardware of the expansion adapter 120 can operate on the electrical power supplied from the battery 112 of the power module 110. In some embodiments, the expansion adapter 120 may include a mechanical mechanism or a feature of its shape to securely attach to the power module 110 and/or the mobile device 150. Further, the expansion adapter 120 can be designed to relay the electrical power supplied from the battery 112 to the mobile device 150 via the device interface 122 so that the mobile device 150 can also operate on the electrical power supplied by the battery 112, in addition to the mobile device 150's own internal battery. In some embodiments, the expansion adapter 120 is configured to draw electrical power from the internal battery of the mobile device 150 via the device interface 122.

In one embodiment, the expansion adapter 120 has a shape independent of the shape of the mobile device 150. For example, the expansion adapter 120 can have a shape feature or a mechanical mechanism designed to be mechanically secured to the power module 110. But other than the device connector 122, the expansion adapter 120 does not need to be mechanically secured to the mobile device 150. The power module 110 can mechanically secure to the mobile device 150 and the expansion adapter 120 can mechanically secure to the power module 110. This enables the power module 110, the expansion adapter 120 and the mobile device 150 to form a single mechanically integrated (yet detachable) device.

One advantage of this arrangement is that one design of the expansion adapter 120 can be used for different models of mobile devices, provided that the models have the same connector suitable for that particular design of the expansion adapter 120.

For example, different models of smart phones having different shapes can use the same connector, e.g. micro USB, for data and power purpose. Among these smart phones, each model needs a different power module particularly designed to form-fit the shape of that model. However, a single design of the power adapter having a micro USB device interface can be used for the various pairings of a smart phone and a power module.

Another advantage of this arrangement is that the design of the expansion adapter 120 is independent of shapes of mobile devices. The mechanical connections between the expansion adapter 120 and the power module 110 remains as a standardized design, and the electrical power and data interfaces between the expansion adapter 120 and the power module 110 also remains as a standardized design. Thus, multiple expansion adapters can have the same type of electrical power and data interfaces, as well as the same type of mechanical design for the portions of the expansion adapters that are to make contacts with the power modules. In addition, multiple power modules can have the same type of electrical power and data interfaces, as well as the same type of mechanical design for the portions of the power modules that are to make contacts with the expansion adapters. Therefore, any of the expansion adapters 120 (that can have different types of device interface 122) can be connected to any of the power modules 110 adapted for mobile devices having different shapes.

For example, a design of the power module 110 can be retained if a new generation of a particular mobile device retains the same shape as one of an older generation of that particular mobile device while the new generation device uses a connector unlike the one of the older generation. To continue utilizing the same power module 110 with the new generation mobile device, a user just needs to replace an original expansion adapter with another expansion adapter designed for the connector of the new generation.

For another example, assuming the fifth generation of the iPhone smart phone will have the same general body shape as the fourth generation, and assuming the fifth generation will use a connector unlike that of the fourth generation model, all power modules designed for the fourth generation will remain useful for the fifth generation. A user only needs to obtain another expansion adapter having a device interface adapted for the connector of the fifth generation.

In one embodiment, the expansion adapter 120 includes an expansion hardware 128. The expansion hardware 128 is configured to provide at least one hardware functionality. When the expansion adapter 120 is connected to the mobile device 150, the mobile device 150 can conduct data communication with the expansion hardware 128 via the device interface 122. In one embodiment, the mobile device 150 receives data that the expansion hardware 128 collects. In another embodiment, the mobile device 150 transmits control signals and/or output data to the expansion hardware 128 to control an output functionality of the expansion hardware 128. In yet another embodiment, the mobile device 150 conducts both input and output data communication with the expansion hardware 128 to dynamically monitor and control the functionality of the expansion hardware 128.

In one embodiment, the expansion hardware 128 can include different types of data capturing devices. For example, the expansion hardware 128 can include various types of scanners including barcode scanners, credit card readers, and magnetic stripe readers. Further, the expansion hardware 128 can include various types of sensors or receivers including motion sensors, gyroscopes, thermometers, hygrometers, game controllers, RFID receivers, radio receivers BLUETOOTH (a short distance wireless data exchange standard) receivers and WiFi receivers. The expansion hardware 128 can also include various types of medical devices or monitors including electrocardiography (ECG) monitors, pulse oximeters and other types of remote health monitors.

In one embodiment, the expansion hardware 128 can include different types of output devices which receive data or control signals and output or perform in certain physical ways. For example, the expansion hardware 128 can include hardware including projectors, haptic feedback devices, flash lights, light emitting diodes (LEDs), BLUETOOTH (a short distance wireless data exchange standard) transmitters and medical devices.

In one embodiment, there is another type of the expansion adapter 120 called a relay module. The relay module 120 also includes a device interface 122, a power input interface 124, and a power module communication interface 126. The relay module 120 draws electrical power from the battery 112 of the power module 110 via the power input interface 124 and relays the electrical power to the mobile device 150 via the device interface 122. Further the relay module 120 can relay battery status information from the power module 110 to the mobile device 150 and relay battery control information from the mobile device 150 to the power module 110. In some embodiments, the relay module 120 does not necessarily include the expansion hardware as disclosed in the previous paragraphs.

Further, the power module 110 can also include an expansion hardware 118 configured to provide one or more hardware functionalities. The expansion hardware 118 can include any hardware that the expansion hardware 128 can include as disclosed in previous paragraphs. When the expansion adapter 120 is connected to the mobile device 150 and the power module 110 is connected to the expansion adapter 120, the mobile device 150 can conduct data communication with the expansion hardware 118 of the power module 110. The data communication is relayed by the expansion adapter 120. In one embodiment, the mobile device 150 receives data that the expansion hardware 118 collects. In another embodiment, the mobile device 150 transmits control signals and/or output data to the expansion hardware 118 to control a functionality of the expansion hardware 118. In yet another embodiment, the mobile device 150 conducts both input and output data communication with the expansion hardware 118 to dynamically monitor and control one or more functionalities of the expansion hardware 118. For example, the expansion hardware 118 of the power module 110 can include a haptic feedback component configured to provide a mechanical stimulation under the control of the mobile device 150.

The power module 110 and expansion adapter 120 can be designed to connect to and operate with any type of mobile device 150. The mobile device 150 can be or include a smart phone, a tablet, a computer, a game console, a console controller, a remote controller, a media player, a digital camera, a video recorder, a personal digital assistant, a global positioning system (GPS) device, a portable medical device, an electronic watch or a combination thereof. For example, the power module 110 and the expansion module 120 can be designed for iPhone, Pad, iPod Touch or other similar electronic devices.

Figure 2:
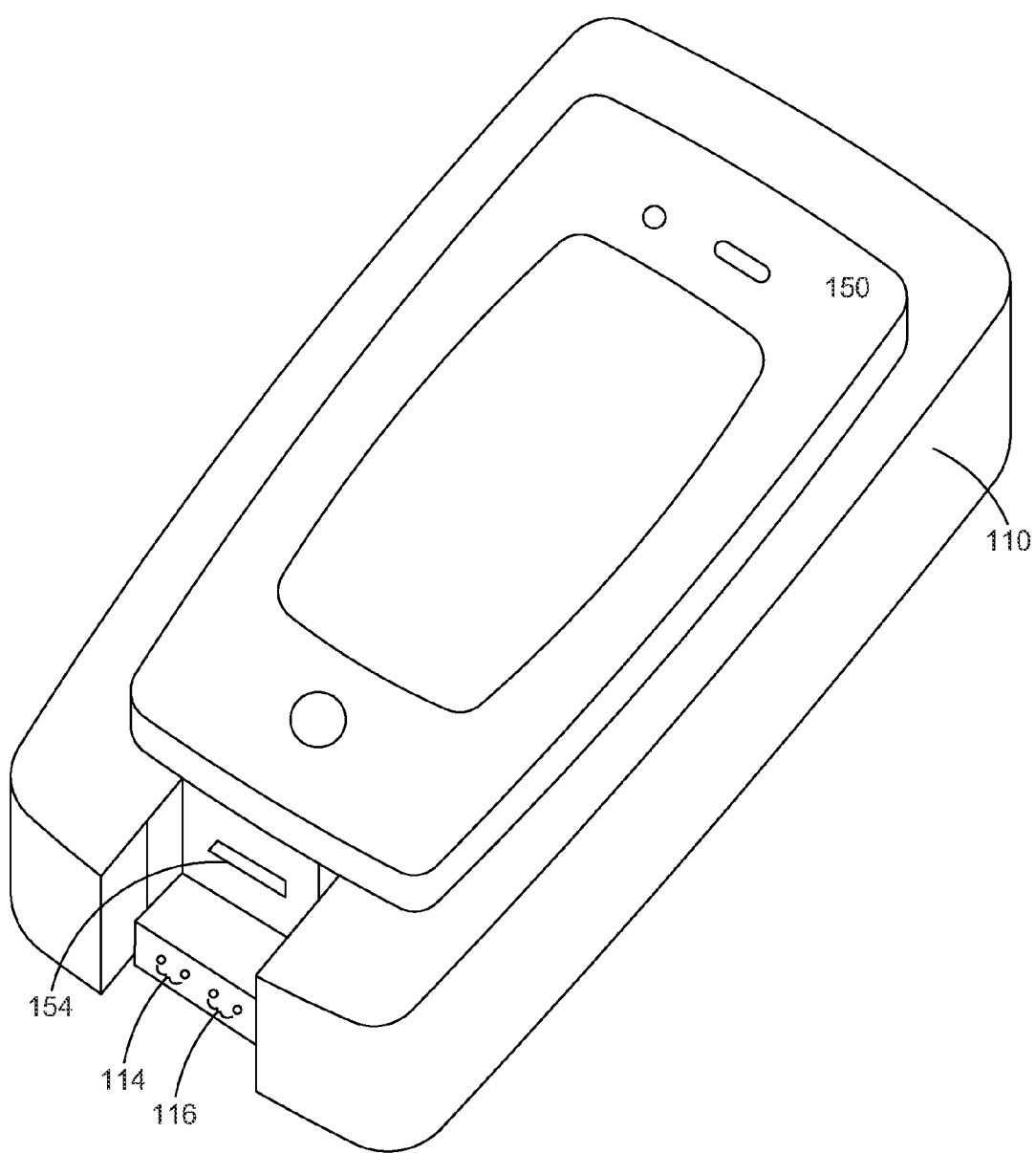
FIG. 2 illustrates an example of a power module attached to a mobile device.

FIG. 2 illustrates an example of a power module attached to a mobile device. The power module 110 has a form-fitting shape adapted to secure the mobile device 150 with the power module 110. The side surface and the back surface of the mobile device 150 are closely engaged to the power module 110. The form-fitting shape of the power module 110 tightly follows the contours of the side surface and the back surface of the mobile device 150. As shown in FIG. 2, the power module 110 securely attaches to the mobile device 150 to retain the mobility of the mobile device 150 in such a way that a user can utilize the combination of the mobile device 150 and the power module 110 as a single device.

The power module 110 includes a battery 112 (not shown in FIG. 2) installed inside of the power module 110. The battery 112 can operate as an external power source to supply electrical power for the mobile device 150. The power module 110 includes a power output interface 114 and a data interface 116. As shown in the embodiment illustrated by FIG. 2, the power output interface 114 includes two metal contacts; and the data interface 116 includes another two metal contacts. The power module 110 includes a charging interface 113 such that the battery 112 can be charged via the charging interface.

Figure 3:
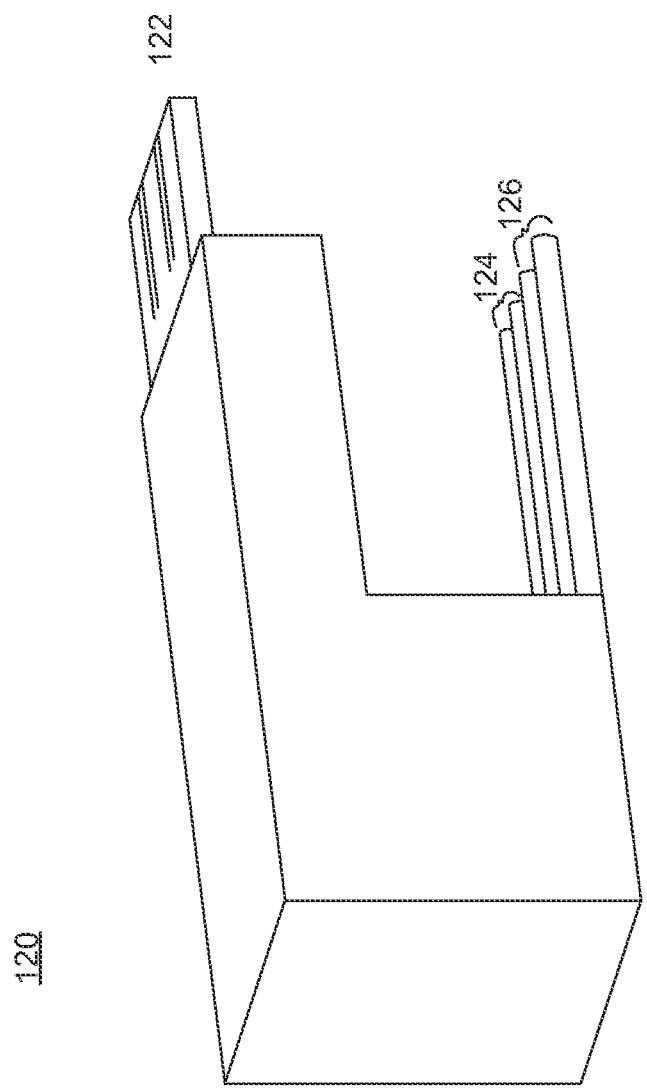
FIG. 3 illustrates an example of an expansion adapter interconnecting a power module and a Mobile device.
Figure 4:
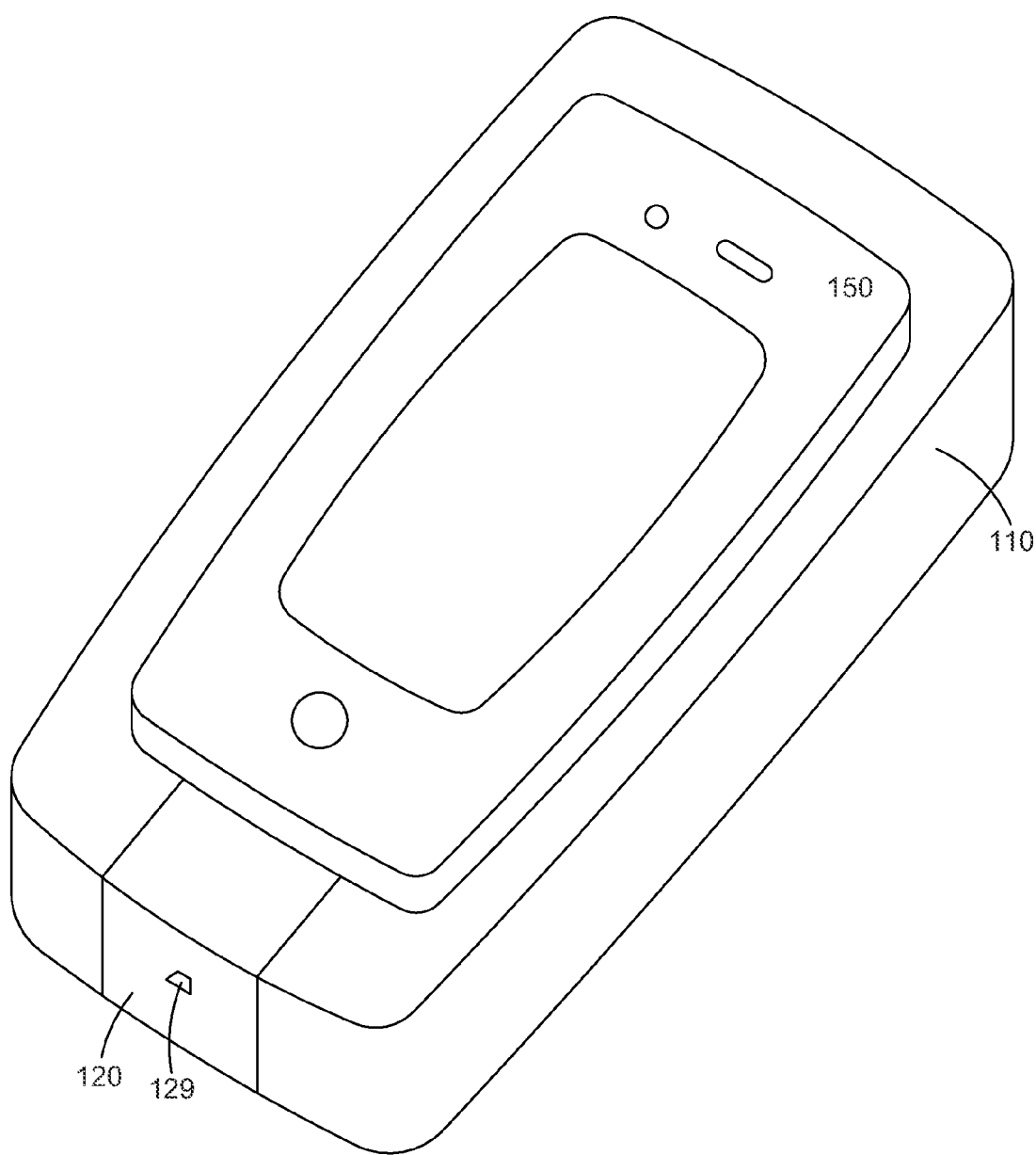
FIG. 4 illustrates an example of an expansion adapter, a power module and a mobile device that are fully engaged together as a single device.

FIG. 3 illustrates an example of an expansion adapter. The expansion adapter 120 includes a device interface 122 configured to electrically connect to the mobile device 150 in a detachable manner. As shown in FIG. 3, the device interface 122 is a male connector including multiple metal pins. The male connector is configured to be inserted and connected into the connector receptacle 154 (shown in FIG. 2) of the mobile device 150. The expansion adapter 120 further includes a power input interface 124. As shown in the embodiment illustrated by FIG. 3, the power input interface 124 includes two metal pins that are supported by spring mechanism. When the expansion adapter 120 is fully engaged with the combination of the mobile device 150 and the power module 110 as shown in FIG. 4, the metal pins are electrically coupled to the metal contacts of the power output interface 114 of the power module 110 for supplying electrical power. Similarly, the power module communication interface 126 of the expansion adapter 120 includes two additional metal pins. When the expansion adapter 120 is fully engaged to the combination of the mobile device 150 and the power module 110 as shown in FIG. 4, the metal pins are electrically coupled to the metal contacts of the data interface 124 of the power module 110 for data communication between the expansion adapter 120 and the power module 110. The expansion adapter 120 may include an expansion hardware (not shown) configured to provide at least one hardware functionality, as disclosed in the previous paragraphs.

FIG. 4 illustrates an example of an expansion adapter, a power module and a mobile device that are fully engaged together as a single device. Through the expansion adapter 120, the mobile device 150 can draw electrical power from the power module 110. In one embodiment, the expansion adapter 120 further includes an external interface 129. The external interface 129 may be connected to an external power source to charge the battery 112 of the power module 110 and/or the internal built-in battery 152 of the mobile device 150. The external interface 129 may be connected to other electrical devices such that the mobile device 150 can conduct data communication with other electrical devices via the external interface 129 and the device interface 122 of the expansion adapter 120. In other embodiments, the power module 110 can include an external interface 119 (not shown) that has similar functionality as the external interface 129 as disclosed.

Figure 5:
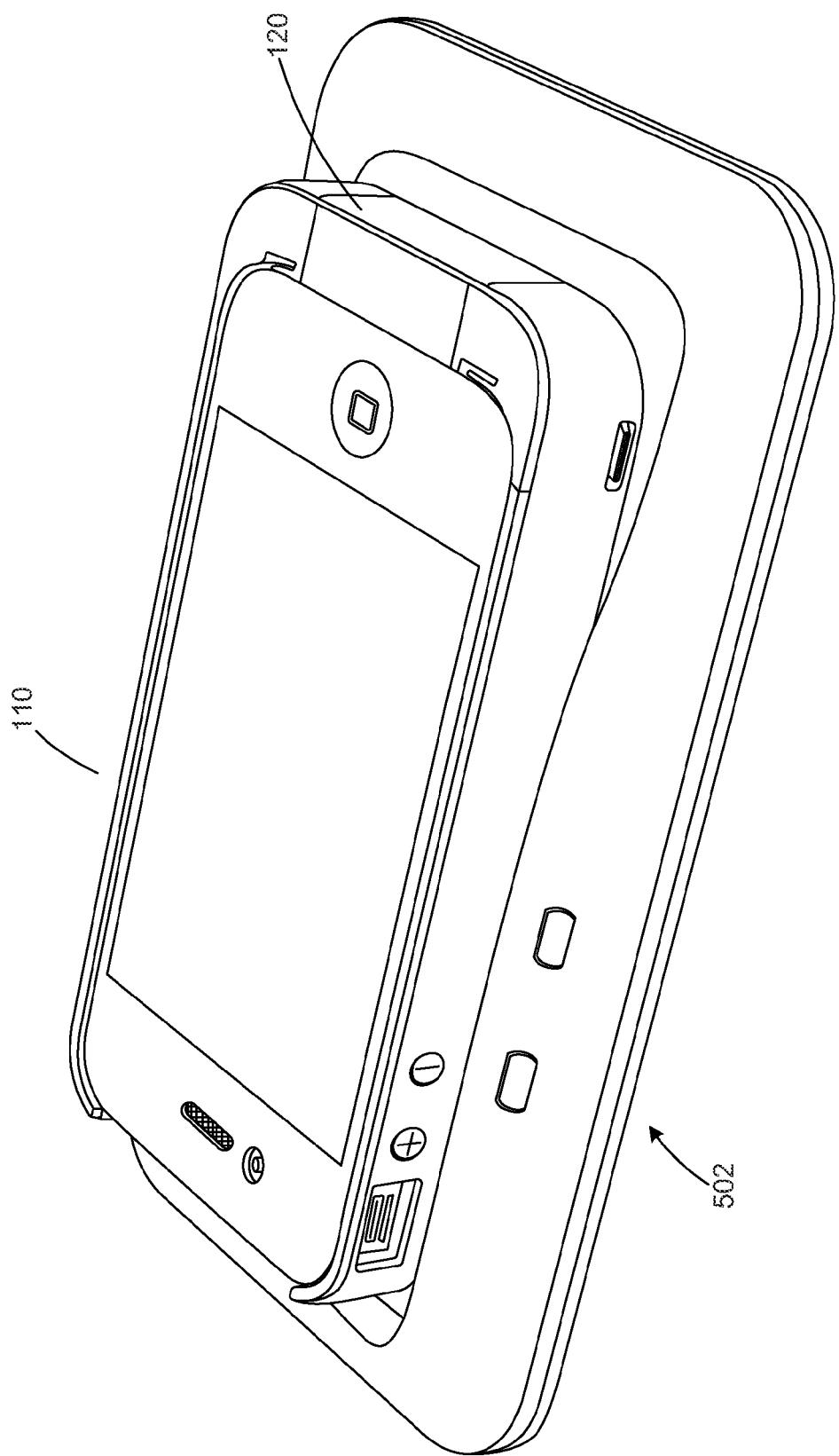
FIG. 5 illustrates an example of a wireless charging mechanism for a power module.

In some embodiments, when an expansion adapter, a power module and a mobile device are fully engaged together as a single device, the combination can be charged wirelessly. FIG. 5 illustrates an example of a wireless charging mechanism for a power module. As shown in FIG. 5, the single device that an expansion adapter, a power module and a mobile device forms is engaged wirelessly to a wireless charging station 502. The power module 110 includes a wireless charging component 113 inside of the power module 110 (not shown) such that the battery 112 can be charged wirelessly using an induction technology, when the power module 110 is in a close proximity of the wireless charging station 502. The wireless charging station 502 can include one or more status lights (such as LED lights) to indicate the charging status.

Figure 6:
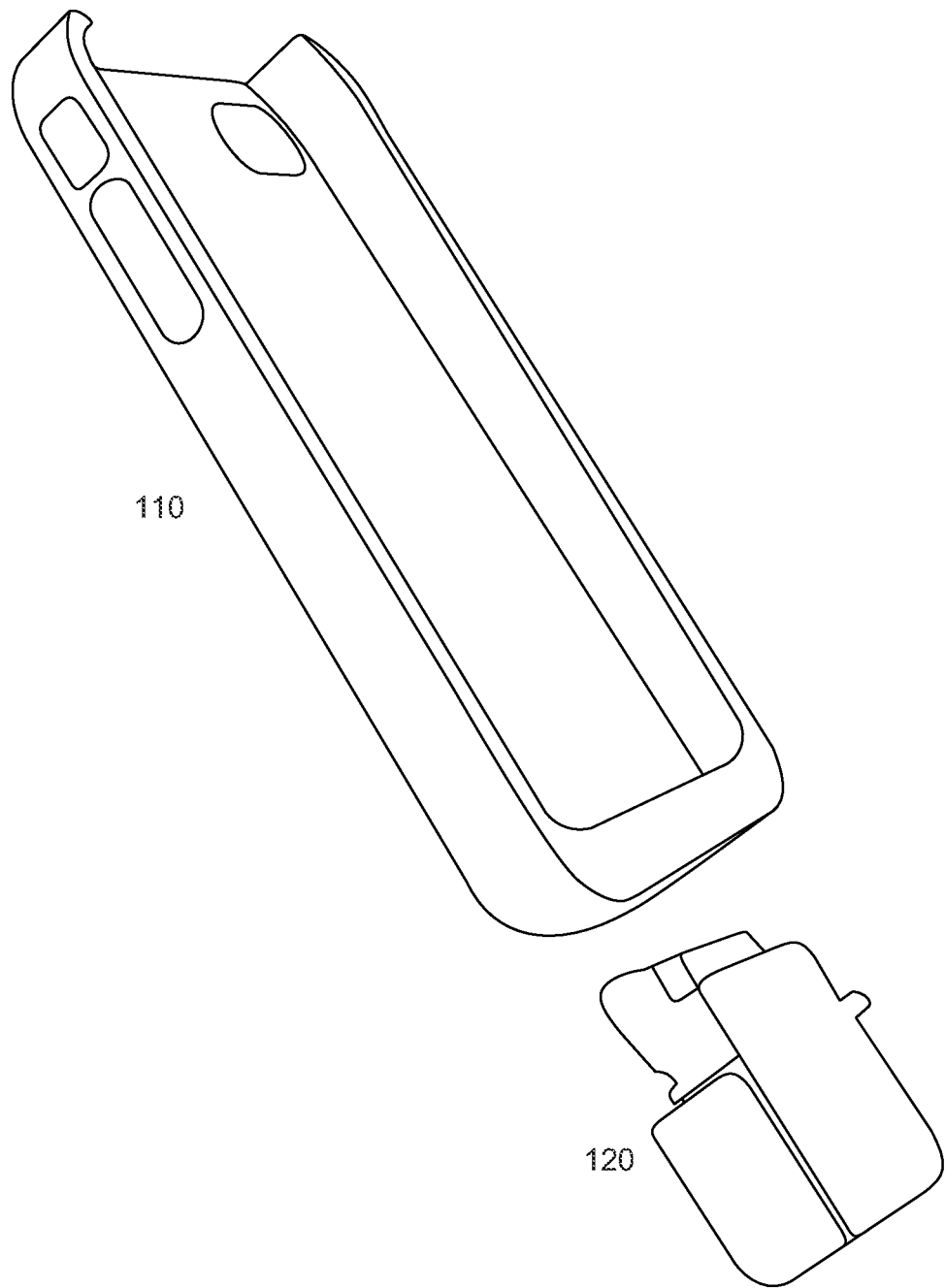
FIG. 6 illustrates an example of a power module and an expansion adapter having a barcode scanning functionality.

With the standardized power and data interfaces between the power module 110 and the expansion adapter 120, a power module can operate with expansion adapters having various hardware functionalities. For example, FIG. 6 illustrates an example of a power module and an expansion adapter having a barcode scanning functionality. The expansion adapter 120 includes a barcode scanner 128 (inside of the expansion adapter 120, not shown) for reading printed barcodes. The barcode scanner 128 includes a light source, a lens and a light sensor translating optical signals into electrical image signals. The barcode scanner 128 further includes a decoder circuitry configured for recognizing barcode information from the electrical image signals provided by the light sensor and sending the recognized barcode information to a mobile device 150 via the device interface 122 of the expansion adapter 120. In another embodiment, an application running on the mobile device 150 recognizes the barcode information from the electrical image signals provided by the light sensor, instead of a decoder circuitry of the barcode scanner 128.

Figure 7:
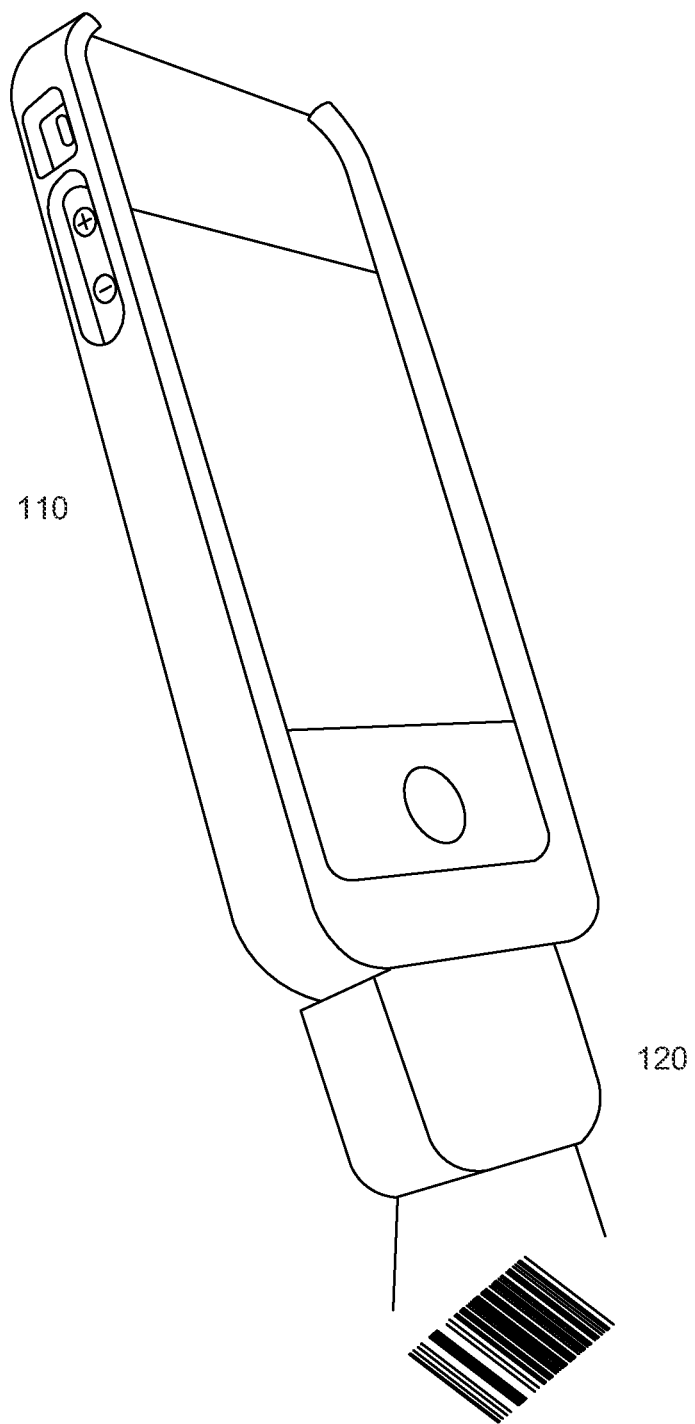
FIG. 7 illustrates an example of a power module and an expansion adapter including a barcode scanner, connected to a mobile device.

FIG. 7 illustrates an example of a power module and an expansion adapter including a barcode scanner connected to a mobile device. The mobile device 150 generates an instruction for barcode scanning and sends the instruction to the barcode scanner 128 (inside of the expansion adapter 120, not shown) via the device interface 122 of the expansion adapter 120. Upon receiving the instruction, the light source of the barcode scanner 128 generates a light. The light travels through the lens of the barcode scanner 128 and is reflected from a product surface having a barcode printed on it. The light sensor of the barcode scanner 128 receives the reflected optical signals for the image of the product surface and translates the optical signals into electrical image signals. The decoder circuitry decodes the barcode information from the electrical image signals and sends back the barcode information to the mobile device 150 via the device interface 122 of the expansion adapter 120. The electrical power that supports the operation of the barcode scanner 128 is drawn from the battery 112 of the power module 110 via the power output interface 114. In some embodiments, the barcode scanner 128 can further draw electrical power from the internal built-in battery 152 of the mobile device 150. For example, in one embodiment, when the barcode scanner 128 receives an indication from the power module 120 via the data interface 116 that the battery 112 of the power module 120 contains electrical power below a predetermined level, the barcode scanner 128 starts to draw electrical power from the mobile device 150 via the device interface 122.

Figure 8:
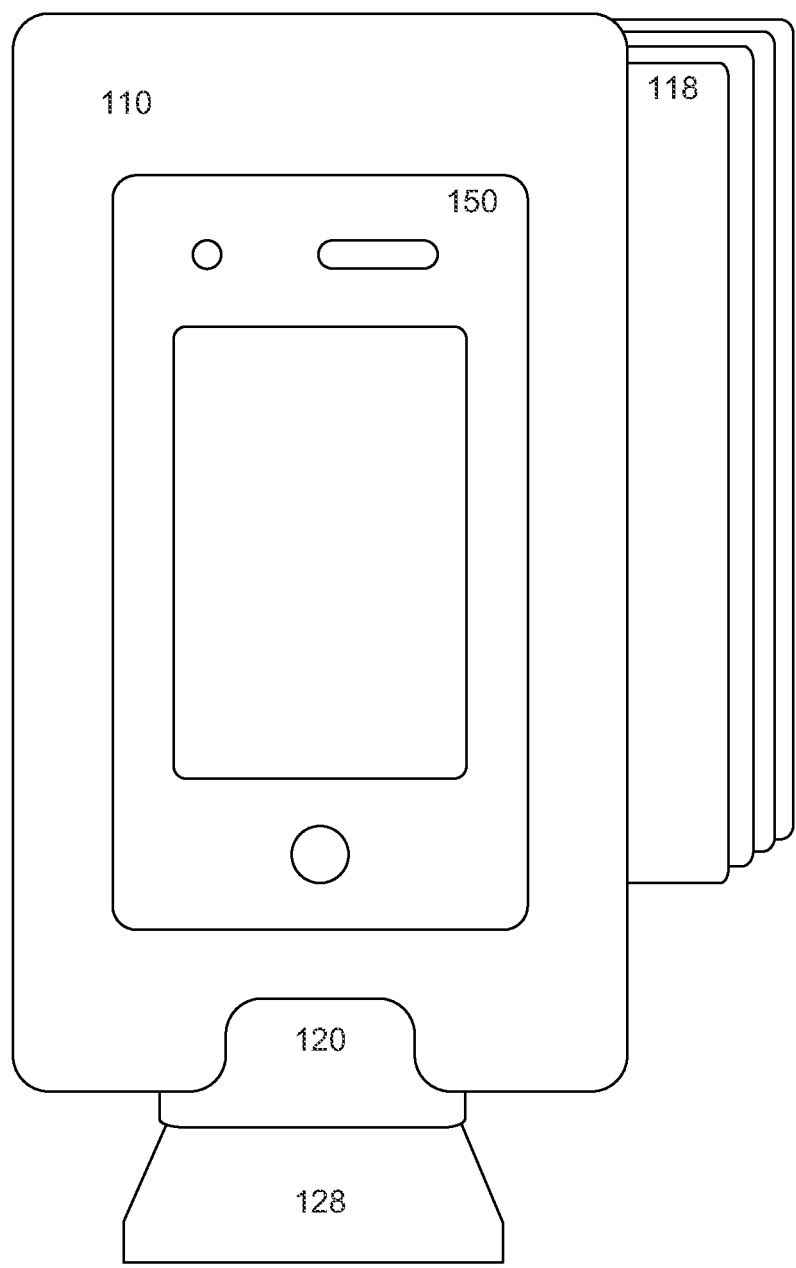
FIG. 8 illustrates an example of a point of sale (POS) terminal formed by a combination of a power module, an expansion adapter and a mobile device.

Both the power module and the expansion adapter can include one or more types of expansion hardware to provide more hardware functionalities. FIG. 8 illustrates an example of a point of sale (POS) terminal 800 formed by a combination of a power module, an expansion adapter and a mobile device. The expansion adapter 120 includes a barcode scanner 128 as disclosed in the previous paragraphs. The power module includes a credit card reader 118 as an expansion hardware.

A user of the POS terminal 800 points the barcode scanner to a barcode of a product and instructs the mobile device 150 to initiate a POS transaction process via an input of the mobile device 150 (e.g. touch screen). Accordingly, the mobile device 150 generates an instruction for barcode scanning and sends the instruction to the barcode scanner 128 of the expansion adapter 120 via the device interface 122. Similarly to the process disclosed in the description for FIG. 7, upon receiving the instruction, the barcode scanner 128 operates on the battery 112 of the power module 110 and returns barcode information to the mobile device 150 via the device interface 122. By comparing the barcode information with a product database stored on the mobile device 150 or a networked server, the mobile device 150 identifies the product for the POS transaction and sends an instruction to the power module 110 to activate the credit card reader 118.

The mobile device's screen may prompt the user to swipe a credit card to pay for the POS transaction. Accordingly, the user swipes a magnetic stripe portion of a credit card through the credit card reader 118 of the power module 110. The credit card reader 118 detects the credit card information encoded as magnetic tracks on the magnetic stripe of the credit card. Then the credit card reader 118 returns the credit reader information including the credit card number to the mobile device 150 via the data interface 116 and device interface 122. Upon receiving the credit card information, the mobile device 150 prompts the user to enter extra information, confirm the transaction, and/or provide a signature via a touch screen of the mobile device 150. Via a wireless or wired network connection, the mobile device 150 sends the information of the transaction to a remote server and receives a confirmation of the transaction. Optionally, the mobile device 150 can generate a receipt and send the receipt to an email address provided by the user. Or a printer connected to the mobile device via a wireless or wired network can print out the receipt. The mobile device 150, the expansion adapter 120 and the power module 110 form an integrated point of sale (POS) terminal device for processing the transaction independently.

In one embodiment, the battery 112 of the power module 110 can supply the electrical power to operate both the credit card reader 118 and the barcode scanner 128. In another embodiment, the credit card reader 118 and the barcode scanner 128 can draw power from both the battery 112 of the power module 110 and the internal built-in battery 152 of the mobile device 150. By monitoring the battery status via the device interface 122 and the data interface 116, the credit card reader 118 and the barcode scanner 128 can dynamically switch between these two power sources based on the status of these two batteries. In yet another embodiment, an operating system of the mobile device 150 monitors the battery status of the battery 112 of the power module 110 and the internal built-in battery 152 of the mobile device 150. The mobile device 150 sends instruction to the credit card reader 118 and the barcode scanner 128 to dynamically switch between these two power sources.

Figure 9:
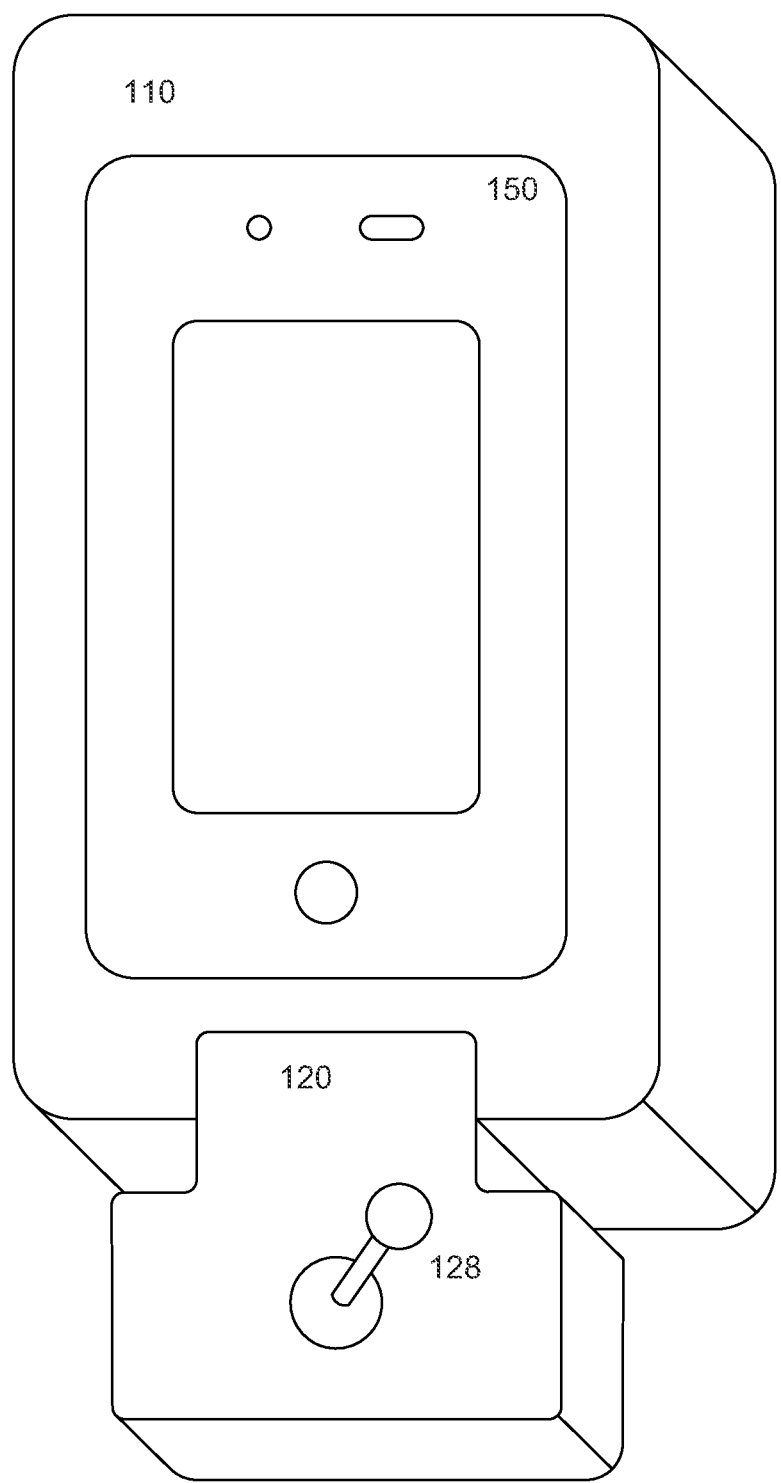
FIG. 9 illustrates an example of a power module and an expansion adapter for gaming purposes.

The power module and/or the expansion adapter can include one or more types of expansion hardware to enhance the user experience for the mobile device 150. For example, FIG. 9 illustrates an example of a power module and an expansion adapter for gaming purposes. The power module 110 is mechanically attached to the mobile device 150. The expansion adapter 120 is connected to the mobile device 150 via the device interface and is connected to the power module 110 via the power module communication interface 126. The expansion adapter 120 includes a controller joystick 128 (a type of game controller) as shown in FIG. 9. The power module 110 includes a vibration feedback component 118 (not shown, a type of haptic feedback component) as an expansion hardware installed inside of the power module 110.

A game, or any other type of program, that supports the controller joystick 128 and the vibration feedback component 118 runs on the mobile device 150. In one embodiment, the game supports the expansion hardware via a driver software. A user can control the game by providing input via the controller joystick 128. The controller joystick translate the user's controlling hand motion into electrical control signals and sends the electrical control signals to the mobile device 150 via the device interface 122. Upon receiving the signals, the game changes its running status based on the electrical control signals.

Depending on the running status of the game, the game issues an instruction for initiating a vibration feedback. For example, the game can display an explosion scene and give instructions for a vibration feedback that synchronizes with the explosion scene. The game sends the instruction to the expansion adapter 120 via the device interface 122 and then relays it to the power module 110 via the power module communication interface 126. Upon receiving the instruction, the vibration feedback component 118 initiates a vibration feedback according to the instruction. In one embodiment, the instruction includes information for the strength, the start time and the duration of the vibration feedback. In one embodiment, both the controller joystick 128 and the vibration feedback component 118 are powered by the battery 112 of the power module 110. In another embodiment, the controller joystick 128 and the vibration feedback component 118 can also be powered by the internal built-in battery 152 of the mobile device 150.

Figure 10:
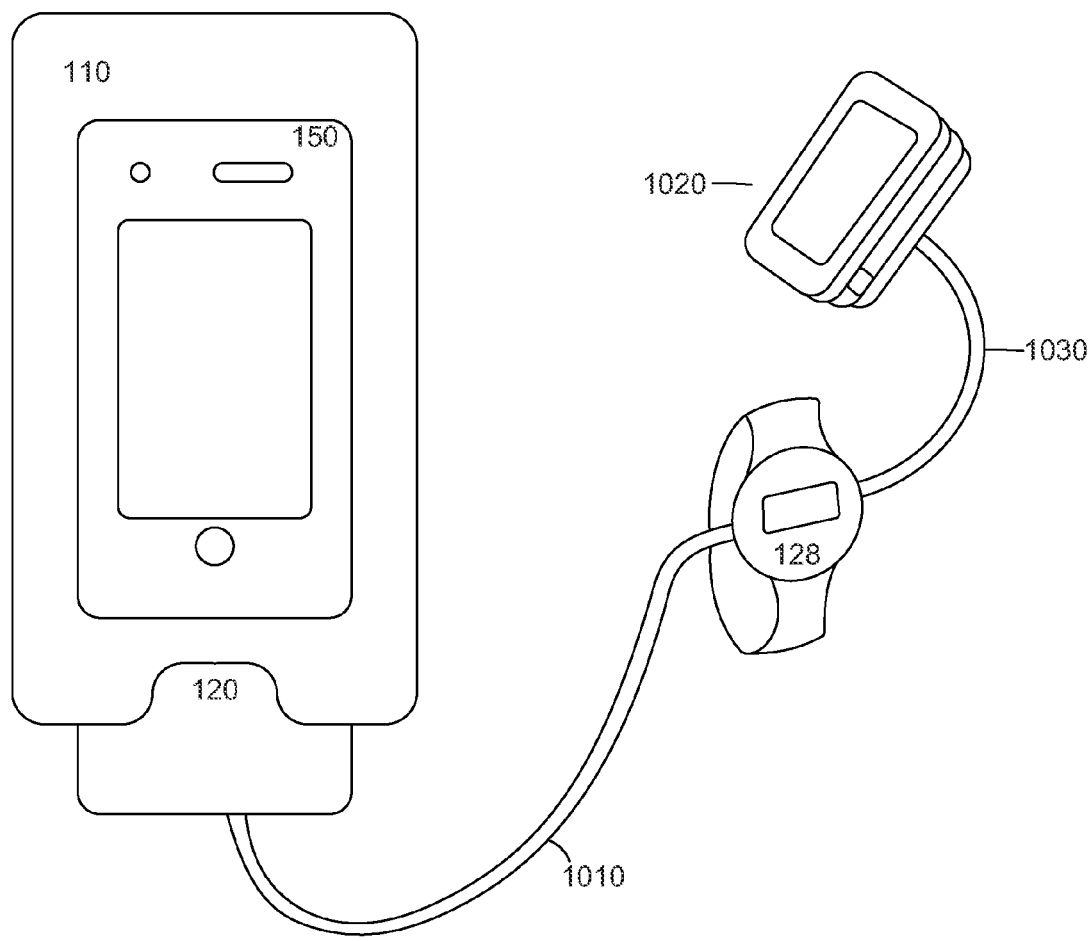
FIG. 10 illustrates an example of a power module and an expansion adapter having medical or health monitoring functionalities.

In addition, the power module and/or the expansion adapter can include one or more types of expansion hardware for medical or health care purposes. For example, FIG. 10 illustrates an example of a power module and an expansion adapter having medical or health monitoring functionalities. The expansion adapter 120 includes an ECG monitor 128. As shown in FIG. 9, the ECG monitor 128 is designed to be worn like a wrist watch. The ECG monitor 128 is electrically coupled with the remaining part of the expansion adapter with an electrical cable 1010.

In one embodiment, the ECG monitor 128 may further include a pulse oximeter 1020 that is electrically coupled with the wrist watch portion of the ECG monitor 128 with an electrical cable 1030. The pulse oximeter 1020 is designed to be worn on a finger. Under the control of the mobile device 150, the ECG monitor 128 and the pulse oximeter 1020 continue monitoring the heart activity information and the oximeter information of a user who wears the ECG monitor 128 and the pulse oximeter 1020. The expansion adapter 120 collects the heart activity information and the oximeter information of the user and sends the heart activity information and the oximeter information to the mobile device 150 via the device interface 122 for further analysis and visualization. In another embodiment, a pulse oximeter can couple to the expansion adapter 120 directly, without an ECG monitor.

In one embodiment, the battery 112 of the power module 110 can supply the electrical power to operate both the ECG monitor 128 and the pulse oximeter 1020. In another embodiment, the mobile device 150 monitors the battery status of the battery 112 of the power module 110 and the internal built-in battery 152 of the mobile device 150. The mobile device 150 sends instructions to the ECG monitor 128 and the pulse oximeter 1020 to dynamically switch between these two power sources.

Figure 11:
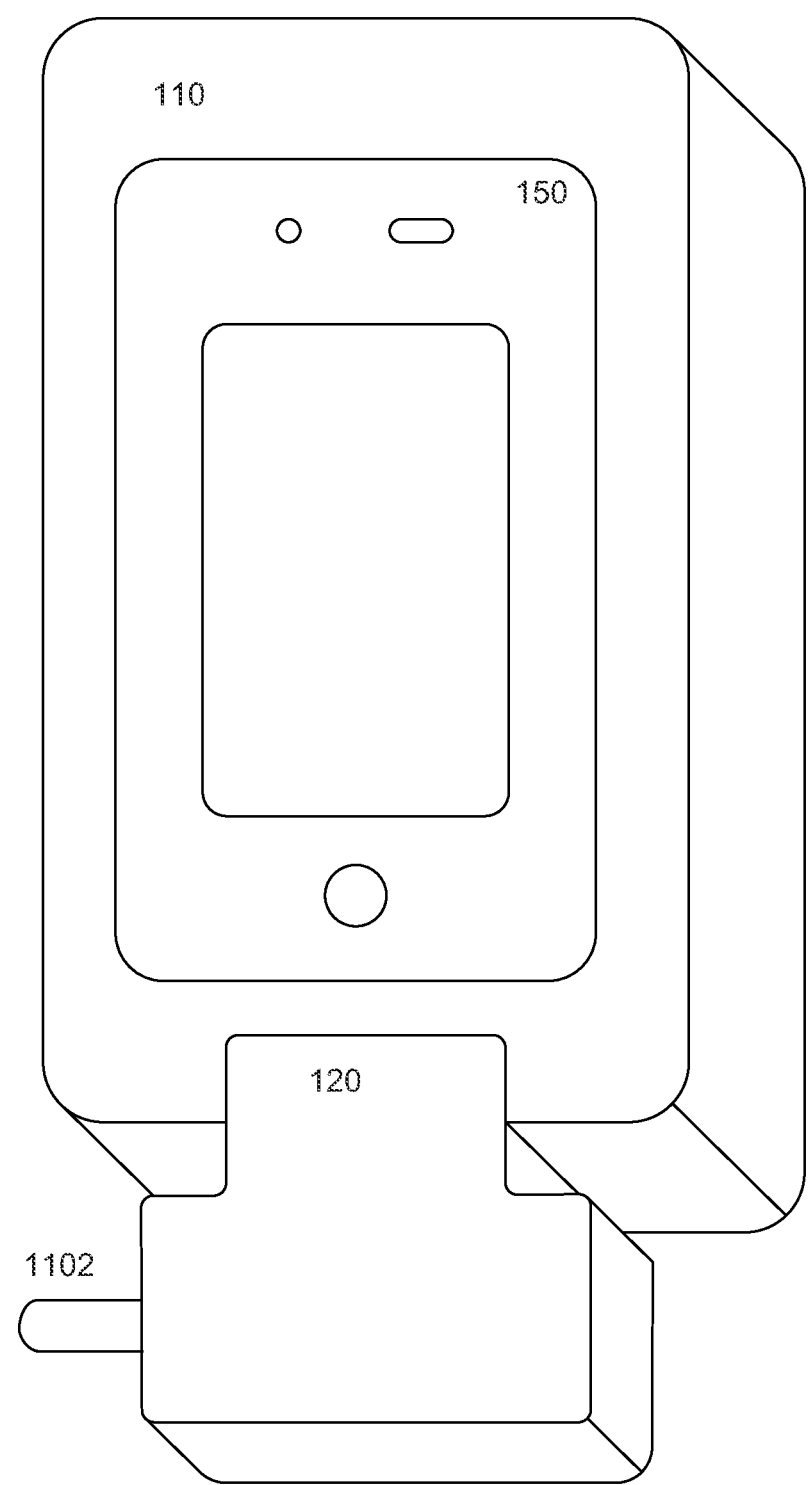
FIG. 11 illustrates an example of a power module and an expansion adapter having a radio receiver functionality.

FIG. 11 illustrates an example of a power module and an expansion adapter having a radio receiver functionality. The expansion adapter 120 includes a radio receiver 128 (not shown) built inside of the expansion adapter 120. As shown in FIG. 11, the radio receiver 128 may further include an antenna 1102 for receiving radio signals. Via the device interface 122 (as shown in FIG. 1), the mobile device 150 may control the operation of the radio receiver 128. For example, the mobile device 150 can send control signals to the radio receiver 128 to switch between AM and FA modulations, to adjust signal frequencies, or to turn on or off the radio receiver 128. The radio receiver 128 receives the radio signals via the antenna 1102. The radio receiver recovers audio or video information from the radio signals by techniques such as modulation and sends the audio or video information to the mobile device 150 for playback.

In one embodiment, the battery 112 of the power module 110 can supply the electrical power to operate the radio receiver 128. In another embodiment, the radio receiver 128 can draw power from both the battery 112 of the power module 110 and the internal built-in battery 152 of the mobile device 150. By monitoring the battery status via the device interface 122 and the data interface 116, the radio receiver 128 can dynamically switch between these two power sources based on the status of these two batteries. In yet another embodiment, the operating system of the mobile device 150 monitors the battery status of the battery 112 of the power module 110 and the internal built-in battery 152 of the mobile device 150. The mobile device 150 sends control signals to the radio receiver 128 to dynamically switch between these two power sources.

Figure 12:
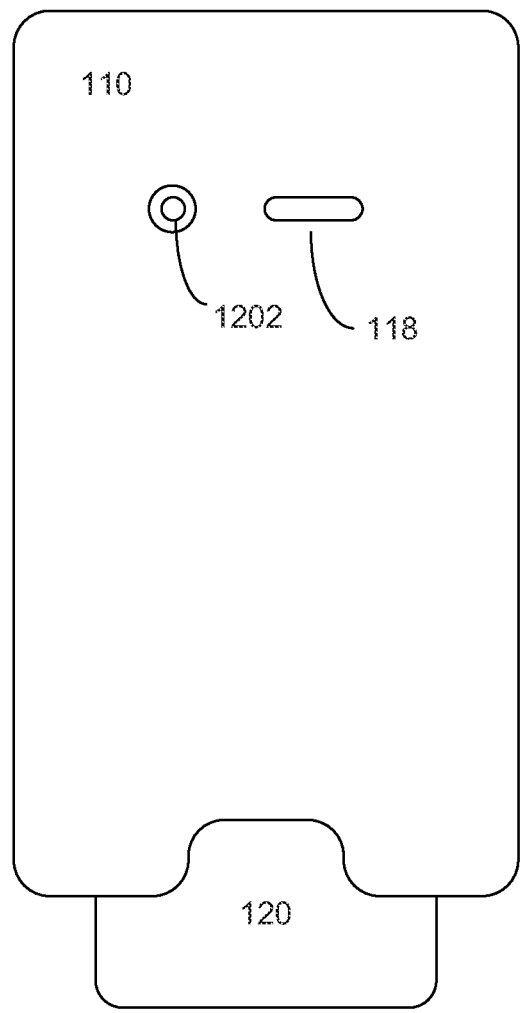
FIG. 12 illustrates an example of a power module having a flash functionality.

FIG. 12 illustrates an example of a power module having a flash functionality. As shown in FIG. 12, the power module 110 includes a flash device 118 on the back side to produce a flash of artificial light (called flash light) for illuminating a scene for photography purpose. For example, when a user instructs (via a button or a touch screen) the mobile device 150 (not shown, covered by the back side of the power module 110) to take a picture with flash. The mobile device 150 detects that a flash device 118 of the power module 150 is available; accordingly the mobile device 150 disables a built-in flash of the mobile device. The mobile device 150 generates and transmits a control signal for the flash device 118. The expansion adapter 120 relays the control signal to the flash device 118. According to the control signal, the flash device 118 emits a flash light which synchronizes with the operation of a built-in camera 1202 of the mobile device 150. The control signal can include instruction for the flash device 118 about the start time, duration period, and strength of the flash light. In one embodiment, the flash device 118 is a Xenon flash device that includes a Xenon flashtube.

In one embodiment, the battery 112 of the power module 110 can supply the electrical power to operate the flash device 118. In another embodiment, by monitoring the battery status via the device interface 122 and the data interface 116, the flash device 118 can dynamically switch between these two power sources based on the status of these two batteries.

Figure 13:
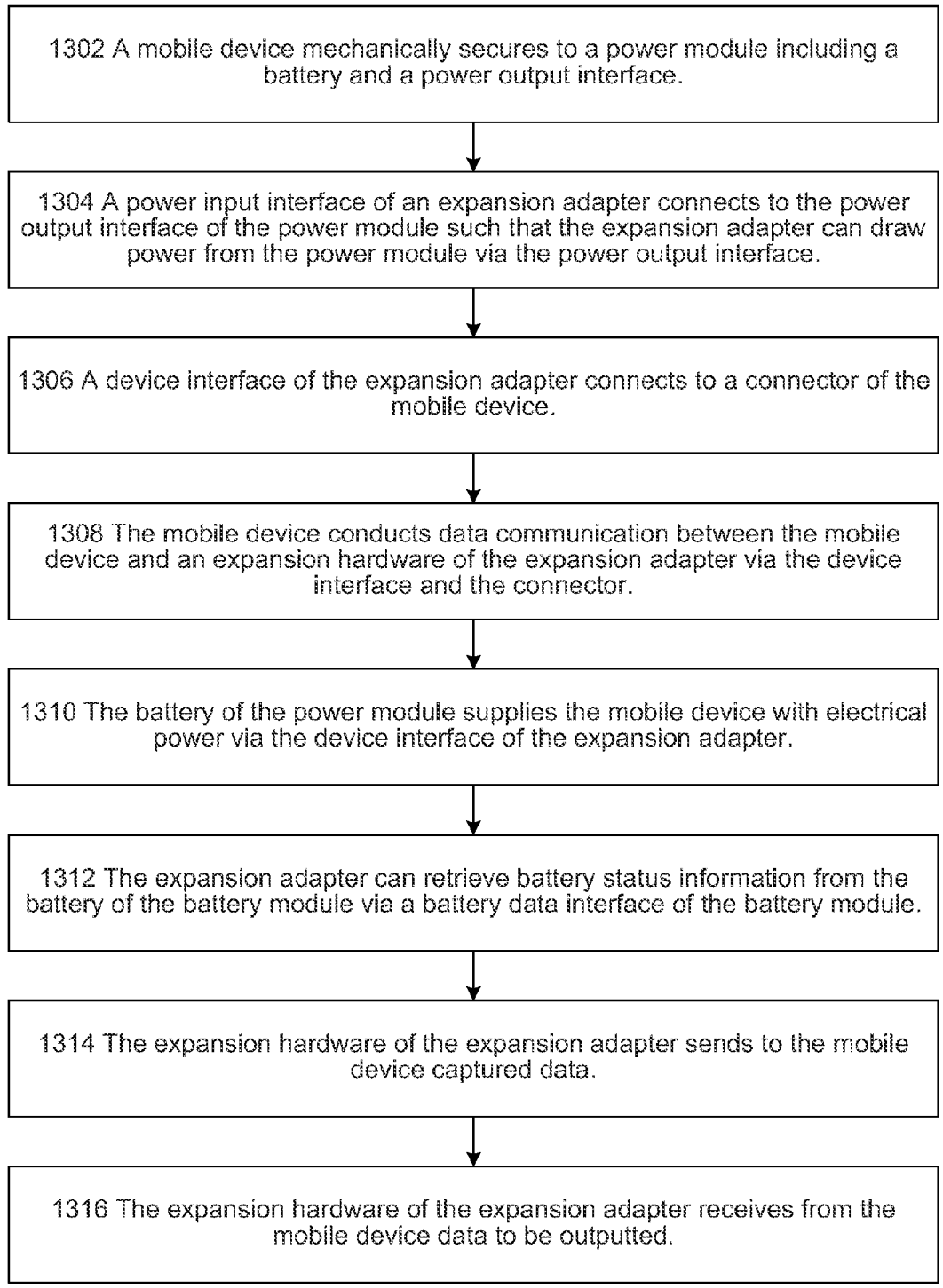
FIG. 13 illustrates an example process for providing additional functionalities to a mobile device.

FIG. 13 illustrates an example process for providing additional functionalities to a mobile device. At step 1302, a mobile device mechanically secures to a power module including a battery and a power output interface. This securing process may involve closely engaging a form-fitting surface of the power module to contours of a part of the mobile device. At step 1304, a power input interface of an expansion adapter connects to the power output interface of the power module such that the expansion adapter can draw power from the power module via the power output interface. Then at step 1306, a device interface of the expansion adapter connects to a connector of the mobile device. At step 1308, the mobile device conducts data communication between the mobile device and an expansion hardware of the expansion adapter via the device interface and the connector. Optionally, at step 1310, the battery of the power module supplies the mobile device with electrical power via the device interface of the expansion adapter. Optionally, at step 1312, the expansion adapter can retrieve battery status information from the battery of the battery module via a battery data interface of the battery module. At step 1314, the expansion hardware of the expansion adapter sends to the mobile device data which may include at least one of the following types of captured data: barcode data, credit card data, magnetic stripe data, motion sensor data, gyroscope data, game controlling data, audio data, video data, BLUETOOTH (a short distance wireless data exchange standard) data, thermometer data, hygrometer data, blood pressure data, electrocardiography (ECG) data, pulse oximetry data, or remote health data. At step 1316, the expansion hardware of the expansion adapter receives from the mobile device data output by devices such as projectors, haptic feedbacks, flash lights, LEDs, BLUETOOTH (a short distance wireless data exchange standard) transmitters, and medical devices.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. An apparatus for a mobile device comprising:
a power module including a battery, a power output interface and a data interface, the power module having a shape adapted to secure the mobile device with the power module; and
an expansion adapter including
a device interface configured to detachably couple to the mobile device;
a power input interface configured to detachably couple to the power output interface of the power module such that the expansion adapter can draw electrical power from the battery of the power module via the power output interface; and
a power module communication interface configured to detachably couple to the data interface of the power module for data communications between the power module and the expansion adapter;
wherein the expansion adapter is interchangeable with an second expansion adaptor that includes a second device interface configured to detachably couple to a second mobile device, and wherein the mobile device and the second mobile device are different models, and wherein the device interface of the expansion adapter is different from the second device interface of the second expansion adapter;
wherein the expansion adapter is further configured to relay battery status information from the power module to the mobile device via the device interface.

2. The apparatus of claim 1, wherein the electrical power is supplied through the expansion adapter to the mobile device in a manner wherein both the mobile device and the expansion adapter can operate on the battery of the power module.

3. The apparatus of claim 1, wherein the power module or the expansion adapter includes an expansion hardware configured to provide a hardware functionality; and wherein the mobile device can conduct data communication with the expansion hardware via the device interface.

4. The apparatus of claim 3, wherein the expansion hardware includes at least one of the following data capturing devices: barcode scanner, credit card reader, magnetic stripe reader, motion sensor, gyroscope, game controller, RFID receiver, radio receiver, short distance wireless data exchange receiver, WiFi receiver, thermometer, hygrometer, blood pressure monitor, electrocardiography (ECG) monitor, pulse oximeter, and remote health monitor.

5. The apparatus of claim 3, wherein the expansion hardware includes at least one of the following output devices: projector, haptic feedback, flash light, LED, short distance wireless data exchange transmitter, and medical device.

6. The apparatus of claim 1, wherein the power module has a form-fitting shape that tightly follows contours of a part of the mobile device that is closely engaged to the power module when the mobile device is secured with the power module.

7. The apparatus of claim 1, wherein the expansion adapter is further configured to supply the mobile device with power that is drawn from the battery of the power module via the device interface.

8. The apparatus of claim 1, wherein the expansion adapter is further configured to receive power from the mobile device via the device interface.

9. The apparatus of claim 1, wherein the mobile device is a smartphone, a tablet, a computer, a game console, a console controller, a remote controller, a media player, a digital camera, a video recorder, a personal digital assistant, a global positioning system (GPS) device, a portable medical device, or an electronic watch.

10. The apparatus of claim 1, wherein the power module further includes a wireless charging component such that the power module can be charged wirelessly.

11. A method comprising:
   drawing power by a mobile device from a power module via an expansion adapter, wherein the power module includes a battery and a power output interface, and further wherein the expansion adapter includes a power input interface coupled to the power output interface of the power module and a device interface coupled to the mobile device;
   communicating data between the mobile device and an expansion hardware of the expansion adapter via the device interface, wherein the power module is secured to the mobile device;
   relaying battery status information from the power module to the mobile device via the device interface of the expansion adapter; and
   replacing the expansion adapter with a second expansion adapter and attaching the power module and the second expansion adapter to a second mobile device, wherein the second mobile device and the mobile device are different models.

12. The method of claim 11, further comprising:
   retrieving battery status information from the battery of the power module via a data interface of the power module.

13. The method of claim 11, further comprising:
   supplying the mobile device with electrical power that is drawn from the battery of the power module via the device interface of the expansion adapter.

14. The method of claim 11, wherein the power module is form-fitted to contours of a part of the mobile device.

15. The method of claim 11, further comprising:
   capturing data by the expansion adapter;
   sending, to the mobile device, from the expansion hardware of the expansion adapter, the data includes at least one of the following captured data: barcode data, credit card data, magnetic stripe data, motion sensor data, gyroscope data, game controlling data, audio data, video data, short distance wireless data exchange data, thermometer data, hygrometer data, blood pressure data, electrocardiography (ECG) data, pulse oximetry data, and remote health data.

16. The method of claim 11, further comprising:
   receiving, from the mobile device, at the expansion hardware of the expansion adapter, data outputted by one of the following output devices: projector, haptic feedback, flash light, LED, short distance wireless data exchange transmitter, and medical device.

17. A power module for a mobile device comprising:
   a battery;
   a power output interface configured to supply power from the battery to the mobile device via an expansion adapter or a relay module when the expansion adapter or the relay module is electrically coupled to the power module via the power output interface and electrically coupled to the mobile device; and
   the power output interface being further configured to draw power from the battery to an expansion hardware of the expansion adapter when the expansion adapter is electrically coupled to the power module via the power output interface and electrically coupled to the mobile device so that the mobile device can conduct data communication with the expansion hardware;
   wherein the power module has a shape adapted to secure the mobile device with the power module;
   wherein the expansion adapter is interchangeable with a second expansion adaptor that is configured to detachably couple to a second mobile device, and wherein the mobile device and the second mobile device are different models;
   wherein the expansion adapter is further configured to relay battery status information from the power module to the mobile device.

18. The power module of claim 17, wherein the power module includes a data interface and a second expansion hardware configured to provide a hardware functionality; and wherein the mobile device can conduct data communication with the second expansion hardware via the data interface.

* * * * *